Figure 1:
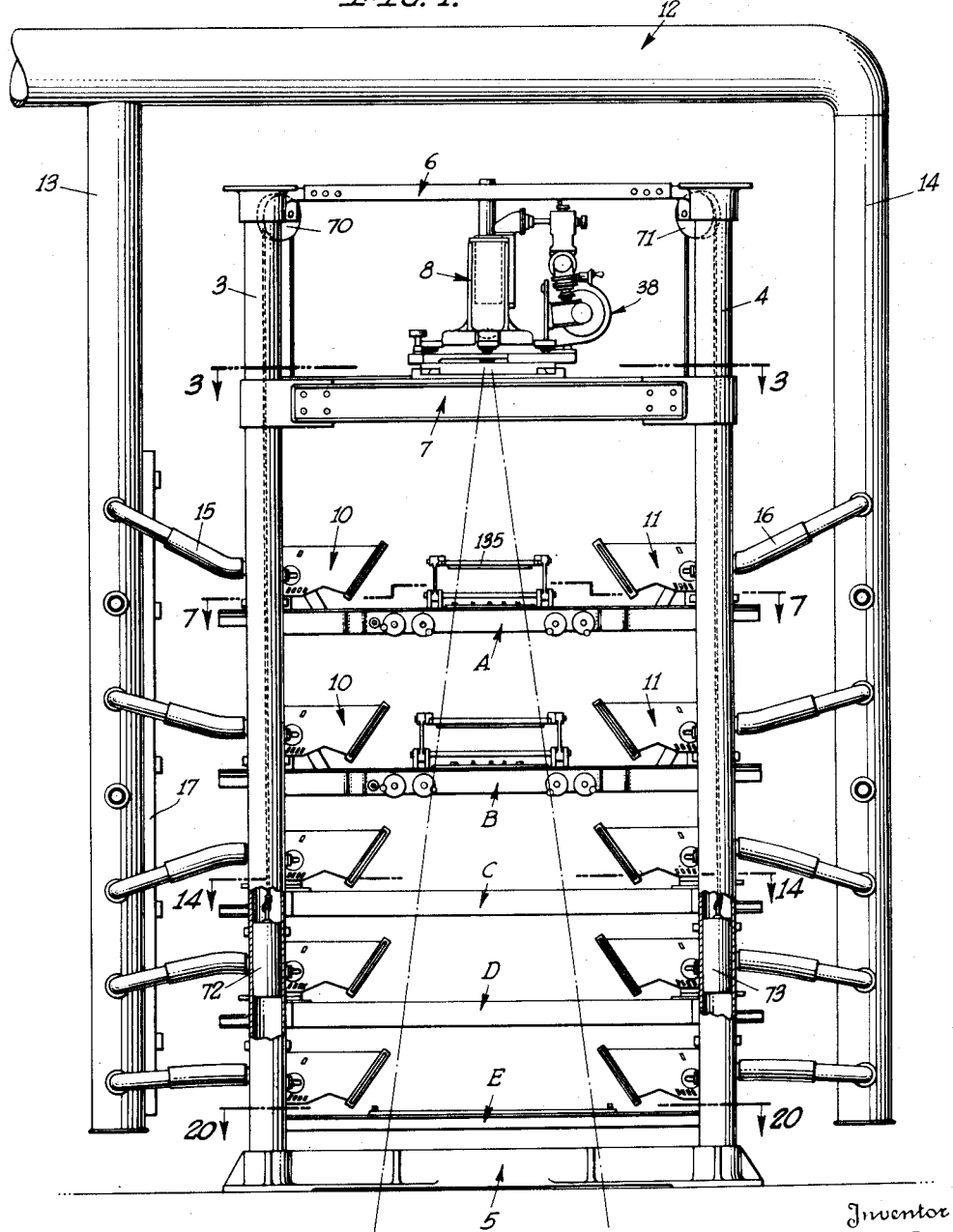

April 23, 1940.  W. E. GARITY  2,198,006

CONTROL DEVICE FOR ANIMATION

Filed Nov. 16, 1938  10 Sheets-Sheet 2

Inventor
WILLIAM E. GARITY

By
Attorney

April 23, 1940.  W. E. GARITY  2,198,006
CONTROL DEVICE FOR ANIMATION
Filed Nov. 16, 1938  10 Sheets-Sheet 3

Inventor
WILLIAM E. GARITY
By C. G. Micketts
Attorney

April 23, 1940.　　　　　W. E. GARITY　　　　　2,198,006
CONTROL DEVICE FOR ANIMATION
Filed Nov. 16, 1938　　　　10 Sheets-Sheet 4
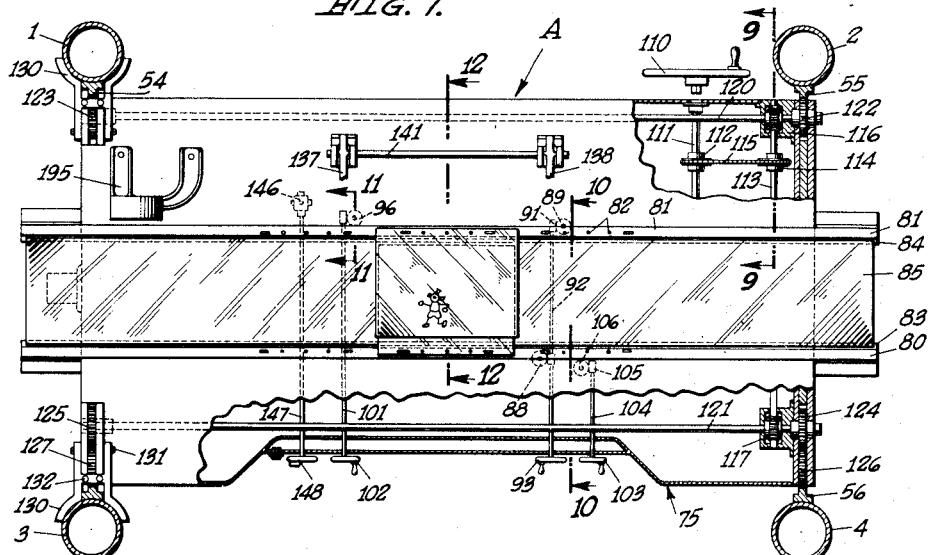
FIG. 7.
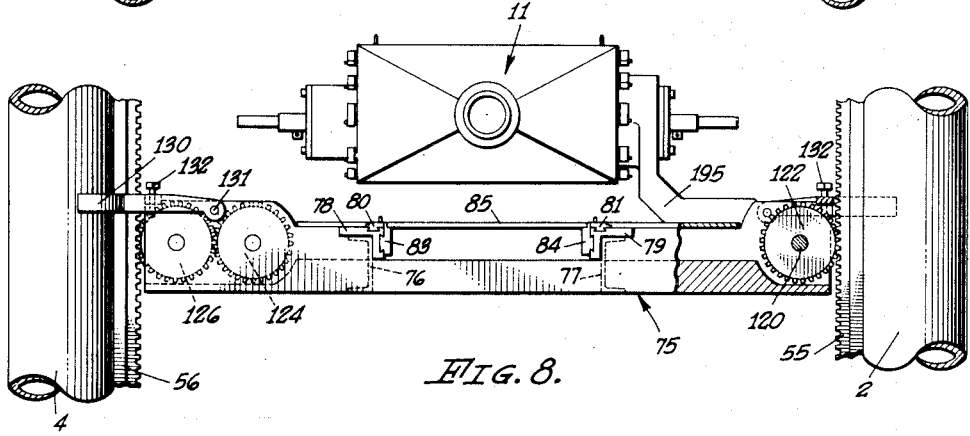
FIG. 8.
FIG. 11.　　　　　　　FIG. 9.
Inventor
WILLIAM E. GARITY
By
Attorney

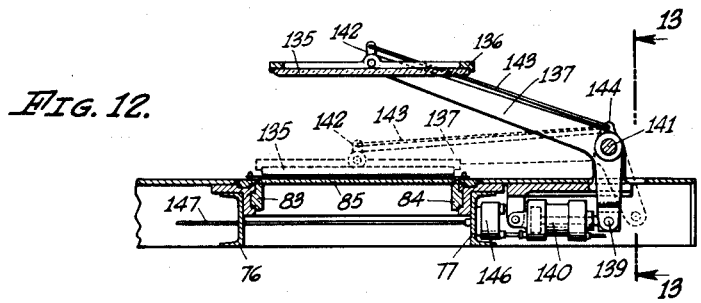
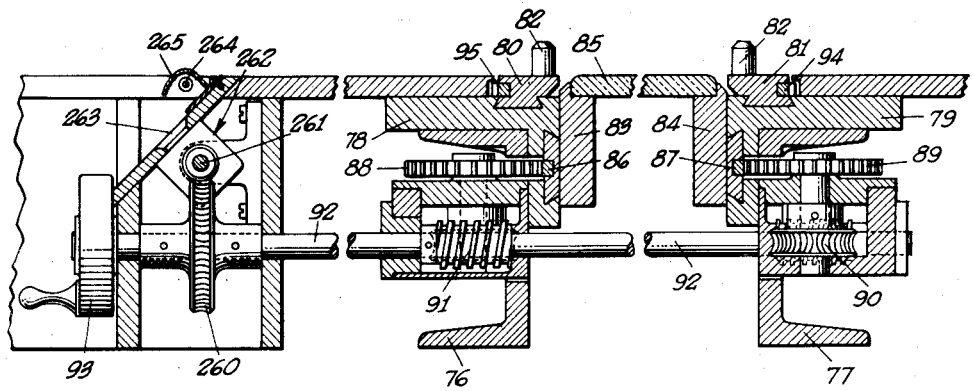
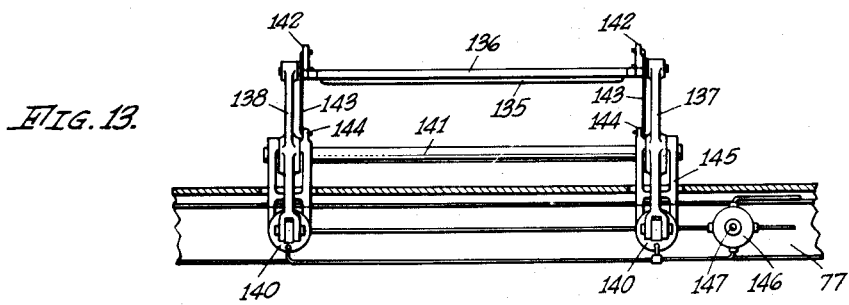
Inventor
WILLIAM E. GARITY

April 23, 1940.  W. E. GARITY  2,198,006

CONTROL DEVICE FOR ANIMATION

Filed Nov. 16, 1938   10 Sheets-Sheet 6

Inventor
WILLIAM E. GARITY

By
Attorney

April 23, 1940. W. E. GARITY 2,198,006
CONTROL DEVICE FOR ANIMATION
Filed Nov. 16, 1938 10 Sheets-Sheet 7
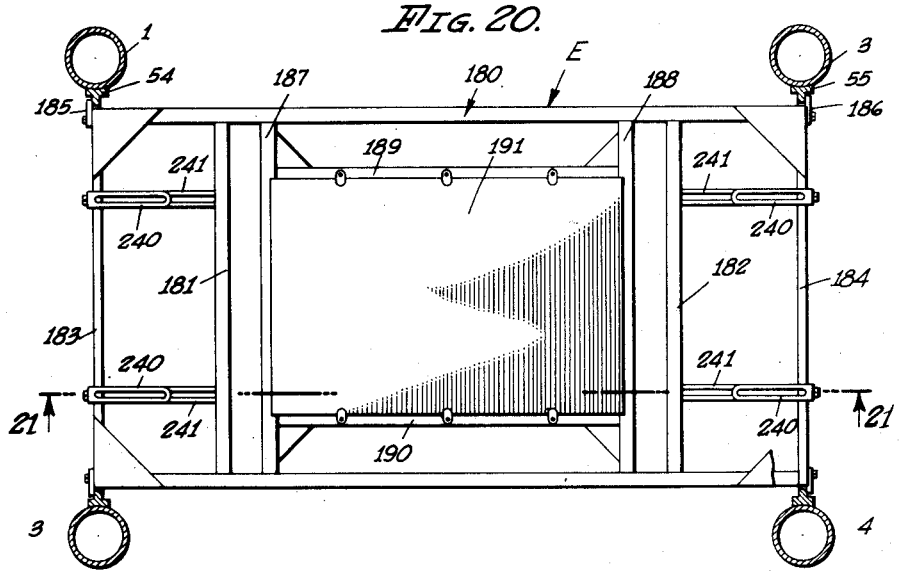
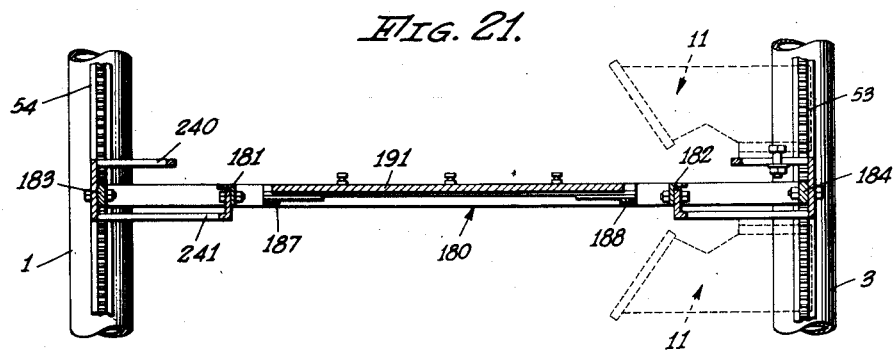
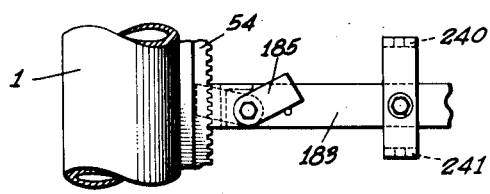
Inventor
WILLIAM E. GARITY April 23, 1940. W. E. GARITY 2,198,006
CONTROL DEVICE FOR ANIMATION
Filed Nov. 16, 1938 10 Sheets-Sheet 8
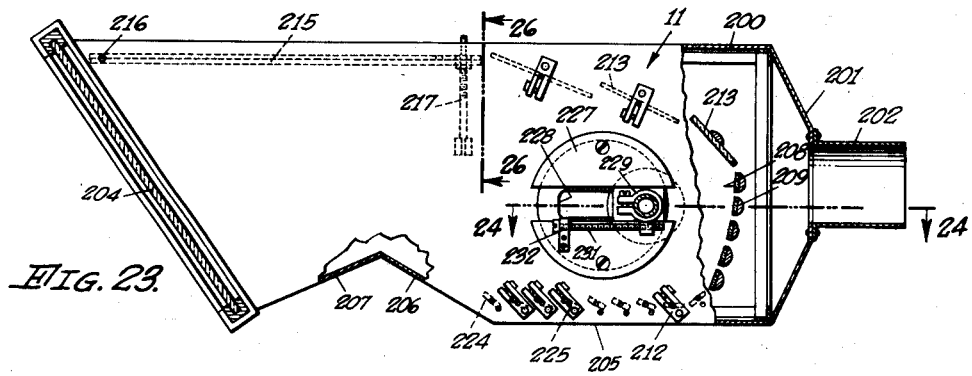
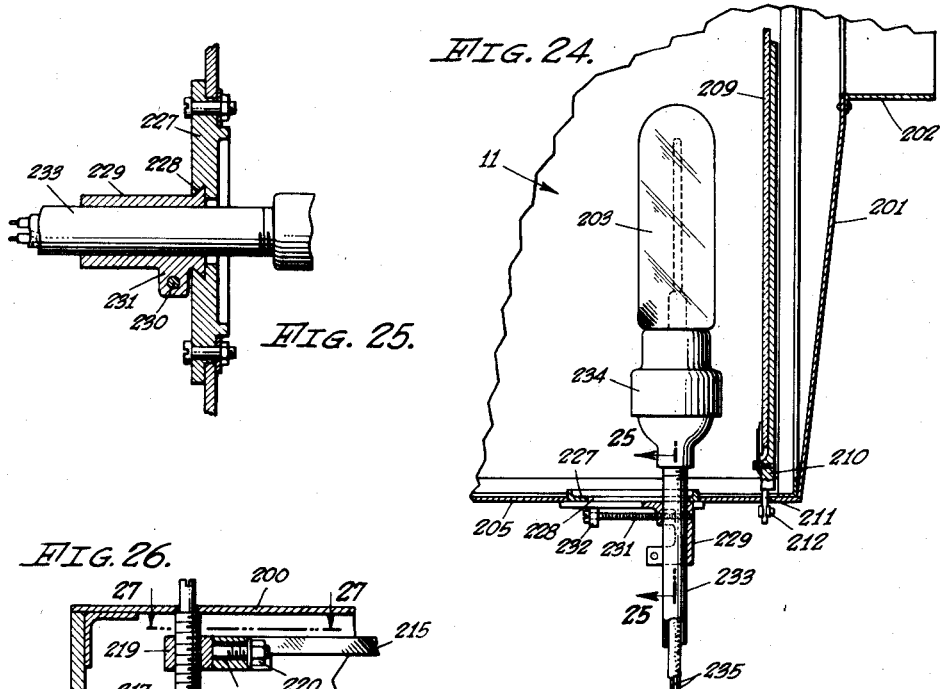
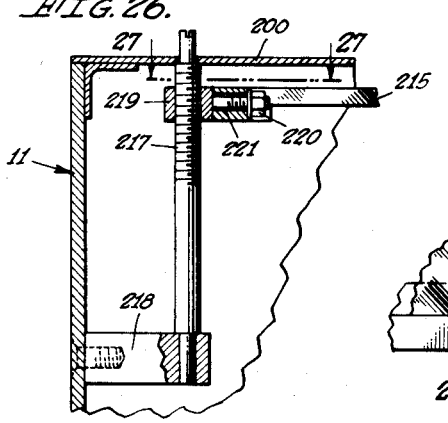
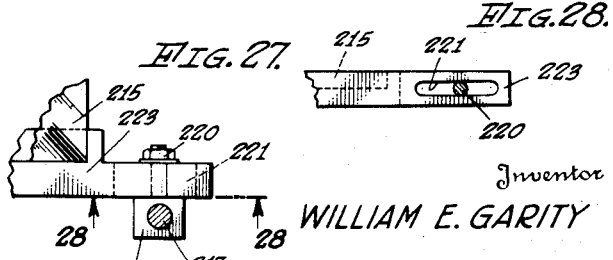
Inventor
WILLIAM E. GARITY April 23, 1940.　　　W. E. GARITY　　　2,198,006
CONTROL DEVICE FOR ANIMATION
Filed Nov. 16, 1938　　　10 Sheets-Sheet 9
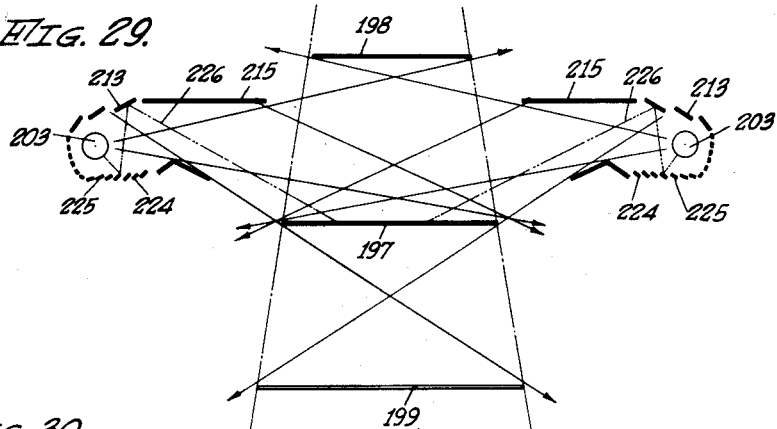
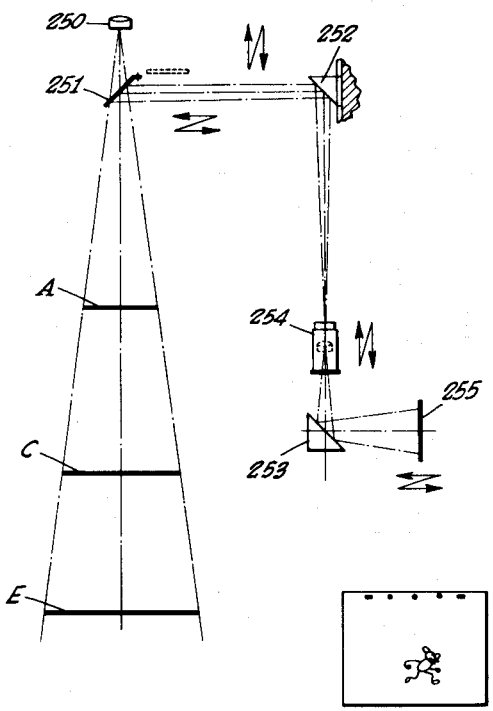
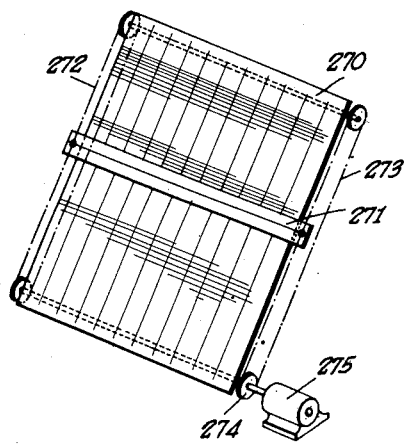
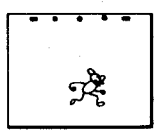
Fig. 32.
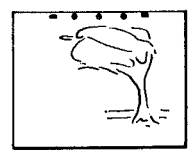
Fig. 33.
Inventor
WILLIAM E. GARITY
By
Attorney

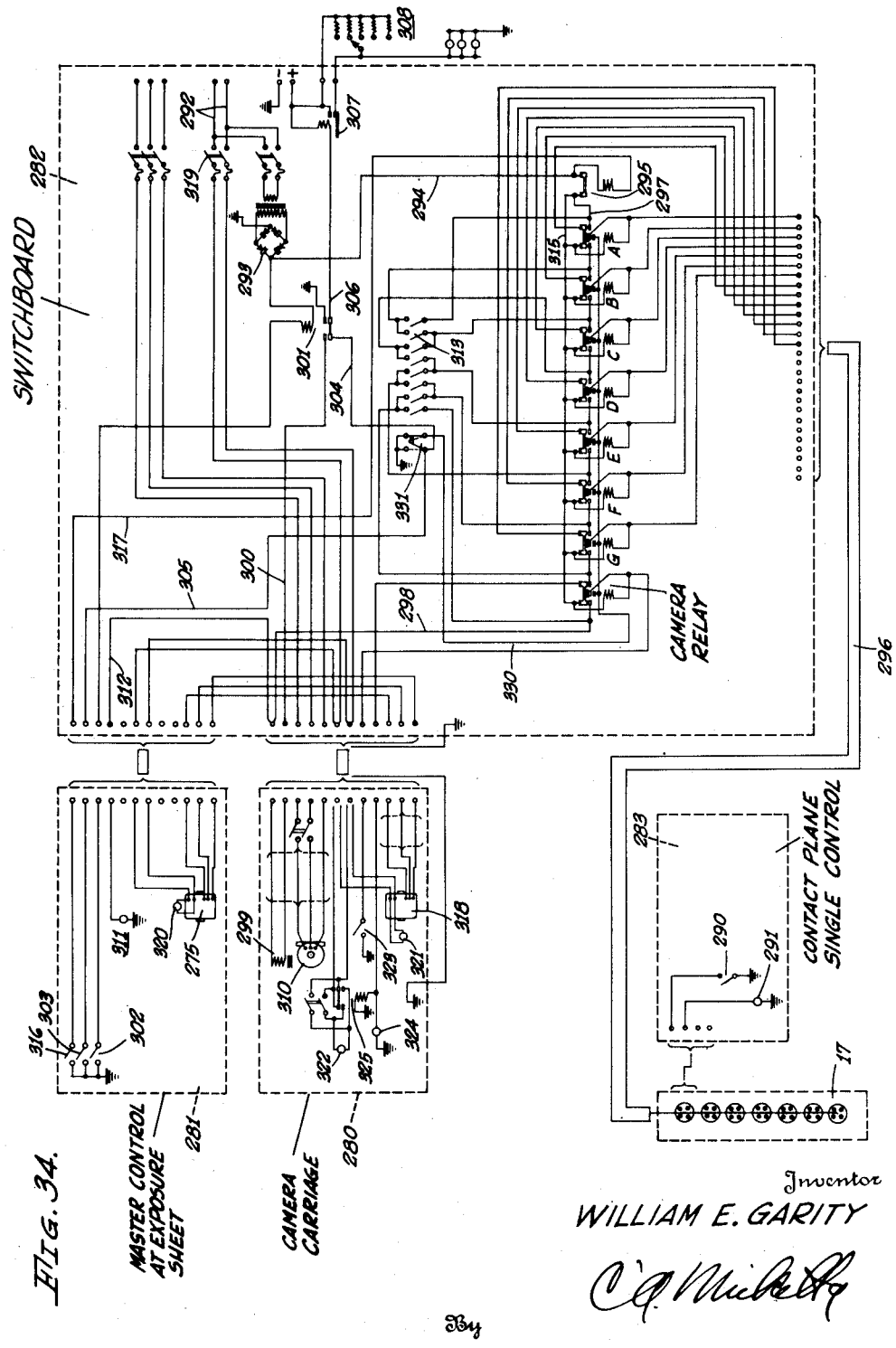

Patented Apr. 23, 1940

2,198,006

UNITED STATES PATENT OFFICE 2,198,006

CONTROL DEVICE FOR ANIMATION

William E. Garity, Los Angeles, Calif., assignor to Walt Disney Productions, Los Angeles, Calif., a corporation of California Application November 16, 1938, Serial No. 240,710

26 Claims. (Cl. 88—16)

The present invention is directed toward means for use in controlling the production of animated photoplays such as animated cartoons, so that the photography of the various drawings, paintings and other pictorial representations may be facilitated. The means of the invention are particularly designed and adapted to the photography of a plurality of drawings, paintings and other pictorial representations at the same time, each drawing or painting representing a portion of a completed scene. During the photography of scenes in which a plurality of elements is represented, one or more of the elements, figures or actors may change position from one frame to another of the finished film in the camera and in order to assure smoothness of action and prevent undesired displacement of the images from one frame to the next of the completed motion picture film, each drawing and pictorial representation must be very carefully and positively positioned and/or advanced in a predetermined manner. The present invention facilitates this work and provides means whereby positive control can be exercised over all of the elements and factors entering into the process.

Generally stated, the method contemplates adjustably positioning drawings and other pictorial representations in spaced relation, the drawings and representations occupying parallel planes. Certain of the drawings may be made upon transparent carriers while others, particularly the background drawings, may be made upon opaque carriers. An adjustably positionable camera then photographs the various drawings, opaque elements or figures carried by some of the transparencies, obliterating or covering portions of other drawings further removed from the camera, the camera then observing and photographing the plurality of drawings so as to produce a complete composite scene upon the film in the camera.

Photography is ordinarily carried out as a step by step or frame by frame operation and between exposures certain of the drawings may be removed and others inserted, or certain of the figures or drawings bodily advanced or moved in planes transverse to the optical axis of the camera. When the completed film is to be in color, the various drawings and pictorial representations employed are also in color. All elements or drawings must be illuminated. The illumination on a single drawing must ordinarily be uniform over the area of the drawing but in order to produce the desired finished composite effect, the degree of illumination on one drawing may have to be either higher or lower than the degree of illumination on another drawing forming an element of the composite scene. Means for controlling illumination are embraced by this invention.

When a plurality of separate drawings are being photographed in the manner described, a number of operators is required, each one being entrusted with the care of a single drawing or plane in which the drawings are adjustably positioned. In order to make certain that the camera is energized only after each operator has completed his particular adjustment, the invention provides means whereby the camera may be operated from a remote control, the control being effective only when a master circuit is locked in position by the combined acts of the various operators. Means are further provided for preventing individual operators from making adjustments during the exposure period or photography.

Various other details of operation will be described hereafter, it being understood that the general object of the invention is to provide means whereby the simultaneous photography of a plurality of pictorial representations may be facilitated and rendered foolproof.

Another object is to provide means for positively positioning each pictorial representation or component part of the scene with respect to other parts and the camera.

Another object is to provide means whereby the individual movement of each cell or drawing to a precisely controlled and predetermined position may be readily attained.

A further object is to provide means whereby the camera may be adjustably positioned vertically, horizontally and about its optical axis.

An object of the invention is to provide means for preventing the operation of the camera until each cell or drawing has been properly positioned and also for releasing the means for moving and adjustably positioning the drawings after the camera has completed its exposure period.

A still further object is to provide means for indicating to the operators when adjustments in position of the cells can be made without disturbing the camera.

A further object is to provide means for controlling the light sources whereby the life of the light sources is prolonged.

An object also is to provide means for preventing the operation of the camera unless the light sources are completely energized.

A still further object of the invention is to provide means whereby the operation of the camera is interlocked with an exposure sheet, thereby positively assuring continuous step by step photography of a scene and eliminating erroneous duplications or omissions from the final sequence.

These and other objects, advantages, adaptations and modifications of the invention will become apparent to those skilled in the art from the following description of a completed form of the machine, it being understood that the specific form of machine shown and described hereafter is simply illustrative of a machine coming within the scope of the invention.

Figure 2:
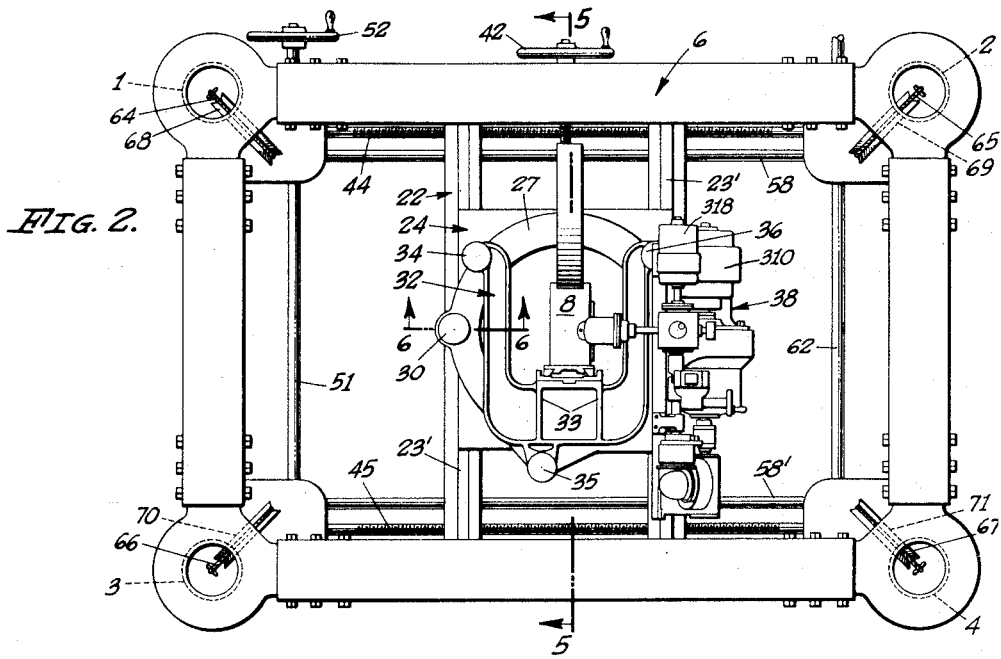
Figure 3:
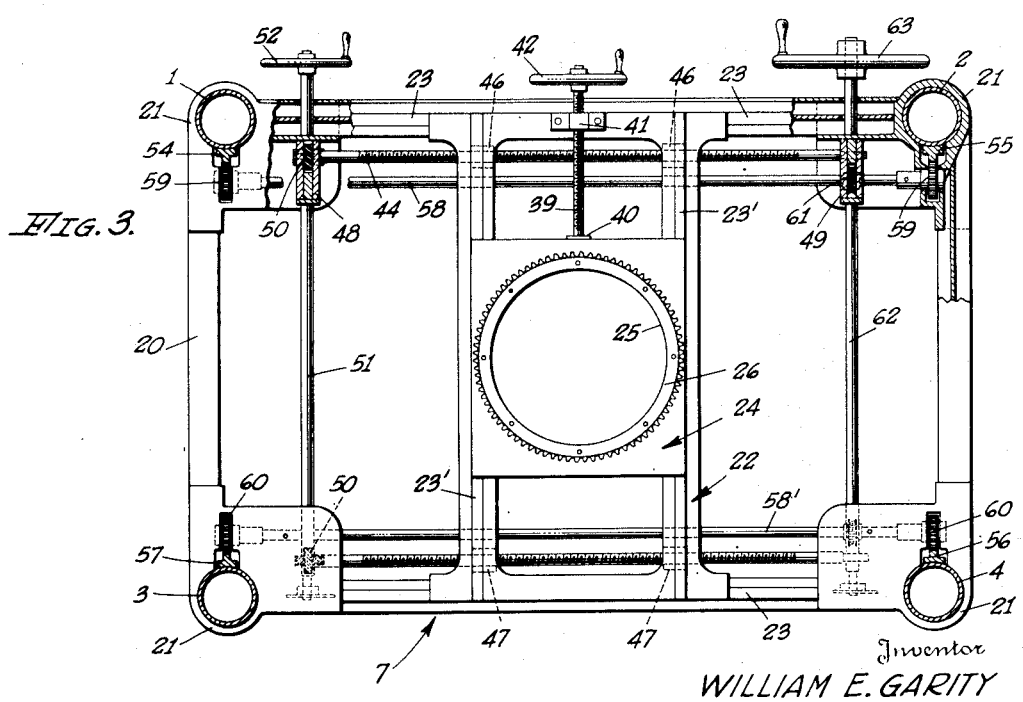
Figure 4:
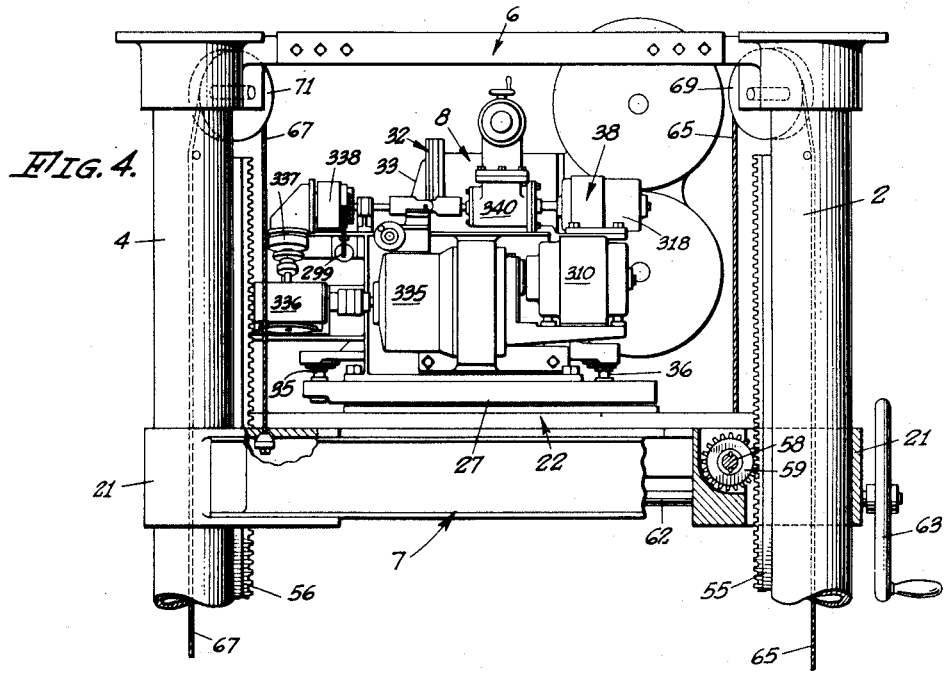
Figure 6:
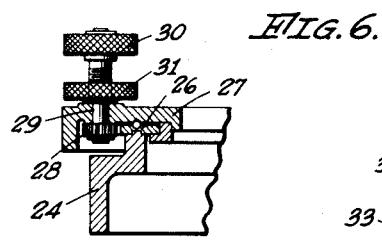
Figure 5:
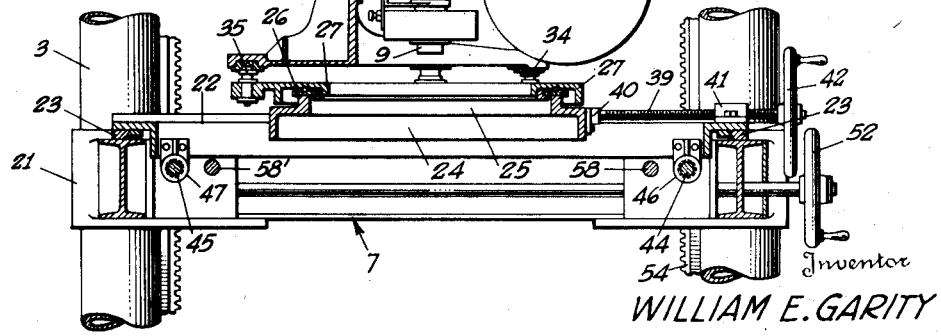
Figure 14:
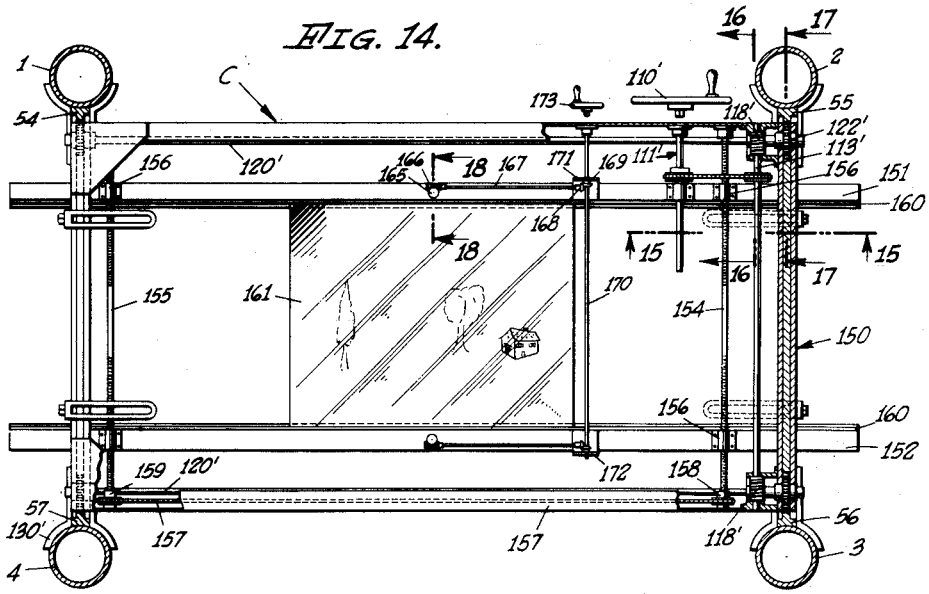
Figure 17:
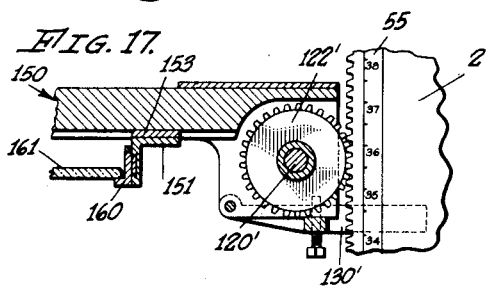
Figure 16:
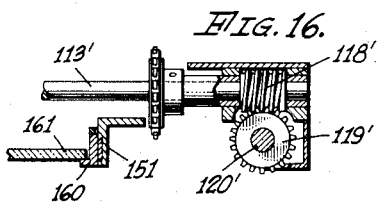
Figure 18:
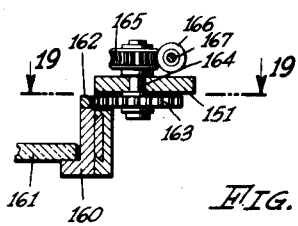
Figure 15:
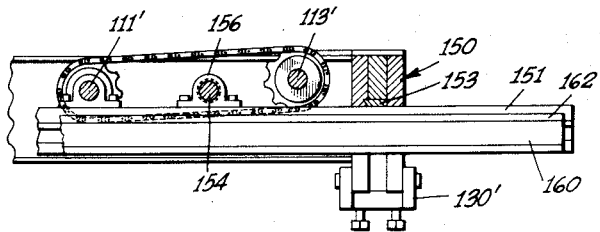
Figure 19:
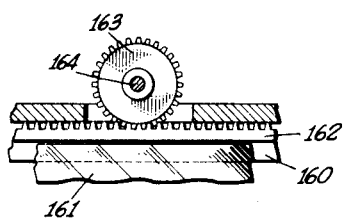

In order to facilitate understanding, reference will be had to the appended drawings, in which:

Fig. 1 is a front elevation of the entire device.
Fig. 2 is a plan view of the camera carriage.
Fig. 3 is a horizontal section taken through the camera carriage along the plane 3—3 of Fig. 1.
Fig. 4 is a side elevation of the camera carriage, parts being broken away.
Fig. 5 is a vertical section through the camera carriage, the section being taken approximately along the plane 5—5 of Fig. 2.
Fig. 6 is an enlarged vertical section of a portion of the camera carriage, the section being taken along the plane 6—6 of Fig. 2.
Fig. 7 is a horizontal section taken approximately along the plane 7—7 of Fig. 1, parts being broken away.
Fig. 8 is an end view of the contact plane shown in Fig. 7.
Fig. 9 is a vertical section taken along the plane 9—9 of Fig. 7 and illustrating an elevating mechanism.
Fig. 10 is an enlarged view in vertical section taken along the plane 10—10 in Fig. 7 of mechanism for moving the supporting means of the contact plane.
Fig. 11 is a transverse vertical section taken along the plane 11—11 of Fig. 7, showing means for moving the peg bar on the contact plane.
Fig. 12 is a transverse section taken along the plane 12—12 of Fig. 7 and illustrating a form of platen operating means.
Fig. 13 is an end view of Fig. 12, the view being taken along the plane 13—13 of said figure.
Fig. 14 is a horizontal section of a background plane, the section being indicated at 14—14 in Fig. 1.
Fig. 15 is a vertical section taken along the plane 15—15 of Fig. 14 and illustrating an elevating control of said background plane.
Fig. 16 is a transverse section taken along the plane 16—16 of Fig. 14 and illustrating the elevating control.
Fig. 17 is a transverse vertical section taken along the plane 17—17 of Fig. 14.
Fig. 18 is an enlarged section taken along the plane 18—18 of Fig. 14, whereas Fig. 19 is a horizontal section taken along the plane 19—19 of Fig. 18, these two figures illustrating means for moving a background support on the background plane.
Fig. 20 is a horizontal section taken along the plane 20—20 of Fig. 1 and illustrating a semi-stationary background support.
Fig. 21 is a longitudinal section taken along the plane 21—21 of Fig. 20.
Fig. 22 is an enlarged side view of a portion of the semi-stationary background plane.
Fig. 23 is a side view, partly broken away, of a form of illuminating means.
Fig. 24 is a horizontal section taken along the plane 24—24 of Fig. 23.
Fig. 25 is an enlarged section taken along the plane 25—25 of Fig. 24.
Fig. 26 is a vertical section taken along the plane 26—26 of Fig. 23.
Figs. 27 and 28 are sections taken of portions of the elements shown in Fig. 26, Fig. 27 being a section taken along the plane 27—27 of Fig. 26, whereas Fig. 28 is a view along plane 28—28 of Fig. 27.
Fig. 29 diagrammatically illustrates the path of light from the sources of illumination with respect to the various drawings.
Fig. 30 diagrammatically represents an arrangement of elements for focusing the camera.
Fig. 31 is a diagrammatic perspective of a sequence control.
Fig. 32 and Fig. 33 represent forms of cells which may be used on the contact planes.
Fig. 34 is a wiring diagram of a master circuit.

The general arrangement and assembly of the apparatus will be apparent from an examination of Figs. 1 and 2 wherein four vertical, cylindrical, hollow, guide posts 1—4 are shown firmly held in a base 5, the upper ends of the guide posts being connected together by a frame 6. A camera carriage, generally indicated at 7, supports a camera 8, having a lens 9 (Fig. 5) directed downwardly. Between the camera 8 and the base 5 of the machine five devices for supporting drawings, paintings, cells, etc., are shown, these being identified as A, B, C, D and E. In the form of machine shown, A and B may be termed movable contact planes provided with platens to maintain the cells in horizontal planes, and these contact planes generally support drawings of foreground characters or objects. Planes C and D may be termed semi-stationary but adjustably positionable background or middle distance planes. Plane E is a background plane. Detailed description of all of these devices will be given hereinafter.

Light source housings are indicated at 10 and 11 and are carried by all or some of the planes A—E. A vacuum conduit 12, leading to the suction side of a fan (not shown) is provided with manifolds 13 and 14 which are connected by flexible hose connections 15 and 16 to the light housings 10 and 11, air currents thus set up removing heat of the lamps and preventing the cells or drawings from curling or otherwise becoming deleteriously affected.

A service gutter 17 is indicated, this gutter containing electrical outlets for plugs carrying pigtail connections to the various planes. In the drawings the electrical connections have not been shown in order to obviate confusion, but the entire wiring diagram, Fig. 34, will permit any electrical engineer to properly connect the devices shown and described.

It may be stated that the term "cell" as used herein refers to a drawing, painting or photographic image of a scene, actor, or portion of a completed scene or figure, carried or impressed upon a transparent carrier such as glass, Celluloid, etc. Such cells are shown in Figs. 32 and 33 and are generally provided with registry holes which engage pins in a support, thereby permitting the image carried thereby to assume a predetermined position with respect to the registry pegs.

Camera carriage

In the embodiment illustrated, the camera carriage 7 comprises a rigid frame 20 (Figs. 1–5) provided with corner sleeves 21 slidable upon the vertical guide posts 1—4. A carriage 22 rests upon and is slidably keyed to laterally extending rails 23 (Fig. 5) so that the carriage 22 is capable of lateral (right to left) motion. The carriage 22 is provided with transversely extending guide rails 23' upon which is slidably mounted a table 24 provided with an aperture or port 25 surrounded by a ring gear 26 fixed to the table 24. A circular cover plate 27 is movably supported on the ring gear with suitable bearings. A pinion 28 carried by a shaft 29 (Fig. 6) may be journalled in a part of the cover plate 27, the pinion being in engagement with the ring gear 26, so that rotation of knob 30 on the shaft 29 will cause the plate 27 to move about the ring gear. Lock nut 31 can be used to lock the plate in place. Means may be provided whereby the precise angular position of the plate 27 from a fixed transverse or lateral axis may be indicated.

A U-shaped holder 32 having an upstanding bracket portion 33 is supported by the plate 27 by means of levelling supports 34, 35 and 36. The camera 8 is attached to the vertical face of the bracket 33 (Figs. 2 and 5). Motors for driving the camera, including clutch mechanism for stop motion (frame by frame operation) and a Selsyn type motor for interlock with the sequence control are generally indicated at 38 and are carried upon the holder 32. More specifically, the holder carries a motor 310, which is connected to a variable speed transmission gearing 335 (capable of being adjusted to any desired ratio), the gearing then leading to a further reduction gearing 336 which then leads to a breakaway safety clutch 337 connected to one side of a single revolution clutch 338, controlled by a relay and solenoid 299. The camera drive shaft 339 is then connected to the driven side of the clutch 338 by suitable gearing in housing 340, and is also connected to the Selsyn motor 318.

The camera holder and its appurtenances permit the operator to cause the shutter to open for any desired time interval (during exposure) by adjusting the variable speed gearing 335. Since in many instances a small iris opening must be used to give desired depth of focus, the exposure time may be as long as 8 to 10 seconds. In the event something jams in the camera, the safety clutch 337 disconnects the driving shaft from the camera. The Selsyn motor 318 is only driven during exposure and is interlocked with the motor 275 on the sequence control of Fig. 31.

It will be noted that the camera 8 is therefore mounted for rotation about its optical axis, the lens 9 being axially positioned within the port 25 and ring gear 26. Means are also provided for moving the camera laterally and transversely, the carriage 24 moving transversely while the carriage 22 moves laterally within the frame 20. Means for adjustably positioning the carriage 24 will now be described.

For permitting regulated transverse motion, a threaded shaft 39 is rotatably attached to the carriage 24 as at 40 (Fig. 5) and passes through an internally threaded guide nut 41 fixed to the carriage 22. The end of shaft 39 carries a hand wheel 42 by which the shaft 39 can be turned, thus imparting motion to the carriage 22.

Means for regulating lateral motion may comprise a pair of threaded shafts 44 and 45 extending through internally threaded hangers 46 and 47 mounted on the carriage 22. The ends of these shafts are journalled in boxes attached to the frame 20 as at 48 and 49 (Fig. 3) and carry spiral gears 50 which mesh with worm gears mounted upon a cross shaft 51 journalled in the frame 20. The cross shaft 51 is provided with a hand wheel 52 by means of which rotation can be imparted to the shaft 51 and threaded shafts 44 and 45, rotation of these imparting lateral motion to the carriage 22.

Means are also provided for raising and lowering the entire camera carriage 7, including frame 20. Each of the guide posts 1—4 may carry a rack gear attached thereto, as for example at 54, 55, 56 and 57. Frame 20 of the camera carriage bears shafts 58 and 58' (journalled in boxes such as 48 and 49), pinions 59 and 60 being mounted on the ends of the shafts, the pinions engaging the rack gears 55, 56, etc. Spiral gears (such as 61 on shaft 58) carried by shafts 58 and 58' engage worms mounted on a shaft 62, this shaft being then journalled in the frame 20 and carrying a hand wheel 63.

In order to counterbalance the weight of the camera carriage 7, cables 64, 65, 66 and 67 are attached to frame 20, pass over sheaves 68, 69, 70 and 71 journalled in frame 6, and terminate in counterweights such as 72 and 73 slidable within the hollow guide posts 1—4. It will be noted that movement of the camera carriage can be controlled as follows: vertical movement by hand wheel 63; lateral movement by hand wheel 52; transverse movement by hand wheel 42. In addition, the camera 8 can be levelled by levelling supports 34—36 and can be rotated by knob 30.

*Contact planes*

In the embodiment of the invention shown in the drawings, planes A and B are of similar construction, and details are shown in Figs. 7 to 13. Light housings are not shown and only a lower part of a presser platen is indicated in Fig. 7.

Each of the contact planes A and B may comprise a frame 75 including laterally extending channel irons 76 and 77 (Fig. 8). These channel irons carry guide rails 78 and 79 provided with dovetailed slots adapted to slidably receive peg bars 80 and 81 (Fig. 10). The peg bars include registry pins 82 adapted to cooperate with registry holes formed in the various drawings or cells being photographed. The vertical faces of the guide members 78 and 79 also form guides and supports for laterally movable bars 83, 84, which carry a sheet of glass or other transparent material, indicated at 85. The bars 83, 84 together with the horizontally disposed transparent plate 85 comprise a movable supporting member. Movement is imparted to this supporting member by means of rack gears 86, 87 carried by the bars 83 and 84. The rack gears are in engagement with pinions 88 and 89 journalled in suitable bearings carried by the channel irons 76 and 77. The stud shafts on which the pinions 88 and 89 are mounted also carry spiral gears such as the gear 90. These spiral gears engage worms such as the worm 91 carried by a transverse shaft 92, such shaft being journalled in suitable bearings and terminating near a hand wheel 93. Rotation of the hand wheel and of the shaft 92 will impart rotation to the pinions 88 and 89. By placing the spiral gears 90 on opposite sides of the shaft 92, the pinions 88 and 89 are caused to rotate in opposite directions so that the bars 83 and 84 are moved simultaneously and in the same direction.

Very often 2 cells or sheets of drawings are carried by the supporting plate 85, one sheet of drawings being held by the pins of peg bar 80 while the other drawing is held by the pins or bar 81. Means are provided, therefore, for moving each of the peg bars independently. Such means are illustrated in Figs. 10 and 11 and may include a rack gear 94 attached to and extending longitudinally of the peg bar 81, it being understood that a similar rack gear 95 is attached to the peg bar 80. The rack gear 94 is in engagement with a spur gear 96 carried upon a stud shaft 97 journaled in a bearing 98. The lower portion of the stud shaft 97 carries a spiral gear 99 which is in engagement with a worm 100 mounted upon a shaft 101 journaled in suitable bearings and provided with a hand wheel 102. Rotation of such hand wheel will thereby cause rotation of the stud shaft 97 and the spur gear 96, this causing lateral movement of the peg bar 81. The peg bar 80 is similarly controlled by means of a hand wheel 103 mounted upon the end of shaft 104, such shaft carrying a worm 105 in engagement with a spiral gear 106, which in turn drives another pinion in engagement with the rack 95 of the peg bar 80. Each of the peg bars can therefore be separately adjusted.

The entire contact plane, including the frame 75, can be raised or lowered by operation of the hand wheel 110 carried by a shaft 111, this shaft being provided with a sprocket 112. A countershaft 113 carries a sprocket 114, which is connected to the sprocket 112 by means of a chain 115. The countershaft is suitably journalled in bearing boxes 116 and 117 and is provided with worm gears such as the gear 118 (Fig. 9). The worm 118 is in engagement with a spiral gear 119 carried upon a lateral shaft 120. An identical arrangement of worm and spiral gears occurs at the opposite side of the machine, the spiral gear in that case being carried by the lateral shaft 121. The shaft 120 is provided with pinion gears 122 and 123, these pinion gears engaging the vertically extending rack gears 54 and 55. Shaft 121, also driven by shaft 113, includes pinions 124 and 125 and these mesh with pinions 126 and 127 respectively, the latter pinions then engaging the vertical racks, such as the rack 56.

Occasionally it is desired to remove a contact plane completely out of the machine. In order to facilitate such removal, the hand wheel 110 may be removably attachable to the shaft 111 and the frame 75 may be provided with an indentation or bay, the various hand wheels 93, 102 and 103 being positioned within the bay or recess (see Fig. 7).

Yokes such as the yoke 130, pivoted at 131 and provided with a locking tap bolt 132, are carried by the frame 75, the yokes 130 partially encircling the vertical guide posts, such as the guide post 3. In Figs. 7 and 8 these yokes are shown in locked position, i. e., in sliding engagement with the posts 1 and 3 so that lateral motion of the entire contact plane is prevented. If it is desired to remove the contact plane, then the tap bolts 132 are loosened and the yokes 130 pivoted upwardly around the axes 131, thereby permitting the entire contact plane to be moved in a horizontal plane with the various pinions, such as the pinions 122 and 126, out of engagement with the corresponding vertically extending rack gears.

The contact planes are also provided with pressure platens for the purpose of holding cells and other drawings in contact with the transparent supporting plates 85. Such platens are illustrated in Figs. 1, 7, 12 and 13. The platen itself may comprise a sheet of glass or other transparent substance, as indicated at 135 carried within a frame 136 pivotally connected at its ends to arms 137 and 138. The arms 137 and 138 may be in the form of bell crank levers, the lower and shorter ends of such arms or levers being connected as at 139 to the piston of a pneumatic cylinder 140. The bell crank lever 137 is shown pivotally supported at 141 (Fig. 12).

In order to maintain the platen 135 in a horizontal plane at all times, the frame 136 may be provided with an upstanding tongue 142 pivotally connected as by means of a rod 143 with a tongue 144 of a bearing yoke 145 in which the bell crank lever 137 is pivoted. The pneumatic cylinder 140 is actuated through a pneumatic valve mechanism 146, such valve being controlled by means of a rod 147 terminating in a control 148. Tubing connecting the opposite sides of the pneumatic piston 140 with the valve and with a source of fluid under pressure is not shown in detail since those skilled in the art may readily procure and install pneumatic means for raising and lowering the platen 135. It is further to be understood that instead of pneumatic means other means such as electrical or mechanical may be employed. When a pneumatic system is used, a separate cylinder 140 is preferably used on each of the bell crank arms 137 and 138, both of such arms being simultaneously operated by a single valve.

Background planes

In Fig. 1 the planes C, D and E have been indicated as background planes but as pointed out previously, these planes may support drawings of objects between mid-foreground and background or drawings of portions of the background. These so-called background planes may be either completely adjustable or they may be of a semi-stationary type. By referring to Figs. 14 to 19, it will be seen that these planes may comprise a frame 150 provided with means similar to those previously described for raising and lowering the entire frame to a predetermined position as, for example, by means of the hand wheel 110′, shaft 111′, countershaft 113′, suitable worm and spiral gearing 118′ and 119′, lateral shafts 120′ and pinions 122′ in engagement with the vertical rack gears 55 carried by the guide posts, such as the post 2. Such planes may also carry the adjustably positionable and removable yokes 130′ which while in operation partly encircle the various guide posts and which may be pivoted out of position in the event it is desired to remove the plane from the machine.

These semi-stationary or background planes may be provided with a pair of laterally extending guide rails 151 and 152 which, as more specifically shown in Fig. 15, are provided with keys 153 slidably received in the transverse end members of the frame 150 whereby the lateral guide rails 151 and 152 may be moved transversely toward or away from each other. Movement of these guide rails 151 and 152 toward and away from each other may be accomplished by means of turn buckles or shafts 154 and 155 journalled at their ends to the frame 150, such shafts being provided with right and left hand threads in engagement with internally threaded hangers as at 156 carried by the guide rails such as 151. The two screw shafts 154 and 155 may be interlocked as by means of a cable or chain 157 passing over sprockets 158 and 159 mounted upon the shafts 154 and 155. Rotation of the shafts 154 and 155 may be accomplished by simply grasping the chain 157 and moving the same, thereby imparting rotation to both of the screw-threaded shafts 154 and 155. Such rotation will cause the guide rails 151 and 152 to approach or recede from each other, depending upon the direction of rotation of the screw-threaded shafts 154 and 155. Suitable means for locking these shafts against extended rotation may be provided.

Each of the guide rails 151 and 152 carries a laterally movable support, such as the angle member 160 slidably mounted for lateral motion along the guide rail 151. These angle members support a transparent plate such as the plate 161, upon which transparencies drawings or the like may be fastened.

Each of the angle members 160 is provided with a longitudinally extending rack gear 162 (see Fig. 18). These rack gears engage pinions 163 mounted upon a stud 164 journaled in each guide member, such as the member 151. The stud 164 may carry a spiral gear 165 in engagement with a worm 166 mounted upon a shaft 167. The shaft 167, suitably journalled in bearings carried by the guide rail 151, terminates in a mitre gear 168, which mitre gear is in engagement with another mitre gear 169 feathered upon a square or keyed shaft 170 journalled in brackets 171 and 172 carried by the guide rails 151 and 152. The shaft 170 may be rotated as by means of the hand wheel 173 so that rotation of the shaft 170 is transmitted through the mitre gears to the shafts 167, which then operate the pinions 163 and cause the angle members 160 to move laterally along the guide rails 151 and 152. Since the guide rails 151 and 152 are capable of transverse motion toward and away from each other (in the manner and by the means previously described), contact between the mitre gears 168 and 169 is maintained during such transverse motion of the guide rails 151 and 152 by reason of the fact that the mitre gears 169 are slidable along the shaft 170.

In this manner, supporting sheets 161 of various widths may be held between the angle members 160 and drawings of varying sizes may be moved laterally by operation of the hand wheel 173.

In Figs. 20, 21 and 22 the lowermost plane E is shown. This plane may comprise a simple frame 180 provided with transverse angle iron members 181 and 182. The end members or end plates 183 and 184 of the frame 180 may have gear teeth cut in the ends thereof so as to be capable of engagement with the vertical rack gears 54, 55, etc. carried by the vertical hollow guide posts 1, 2, 3 and 4. After the frame has been placed in required position by being slid into engagement with the rack gears, it may be prevented from further lateral movement out of such engagement by dropping pivoted retaining lugs 185, 186, etc., these retaining lugs contacting with the side of the rack gears 54, 55, etc.

Additional transverse members, such as the members 187 and 188, together with lateral connecting members such as 189 and 190, may define a table portion on which there can be supported a board, glass plate or other supporting member 191 adapted to receive and hold suitable paintings, drawings or the like.

*Illuminating devices*

Each of the planes A to E inclusive may be provided with suitable illuminating devices adapted to uniformly and regulatably illuminate the drawing, cell or other pictorial representation held by the plane within the field of view of the camera. Light housings 10 and 11 are indicated in Fig. 1. Details of construction of such light housings are shown in Figs. 23 to 29 inclusive. A side view of a light housing 11 is also indicated in Fig. 8.

These light housings may be supported on the planes in a number of different ways. On the contact planes A and B of the embodiment illustrated in the drawings, the light housings are supported upon a bracket 195 (shown in plan view in Fig. 7 and end view in Fig. 8). Generally, however, such light housings consist of a metal case provided with a substantially flat top 200 and plane sides, the rear 201 being conical in form and provided with a circular port and a cylindrical outlet 202. This cylindrical outlet 202 is adapted to receive a flexible hose 16 leading to the vacuum manifold 14 (Fig. 1).

By referring to Fig. 29 it will be seen that in most instances it is desirable to illuminate the top of a drawing or cell, such as the cell 197, without causing light to fall upon the lower side of an upper cell 198 or upon an underlying cell 199. Each light housing includes a light source, such as the light source 203, or a pair of opposed light sources. Fig. 29 shows the path of light rays from such sources and it will be seen that the various reflecting surfaces are so positioned and the light housing is so designed as to preclude light from the source 203 from impinging upon the lower side of the cell 198 or the upper surface of the cell 199, all of the light being directed upon the upper surface of cell 197. The proper distribution of light from the sources 203 is accomplished by an adjustable arrangement of mirrors or other reflecting surfaces.

By referring to Fig. 23, it will be seen that the front of the light housing 11 is provided with an inclined window 204. This window may be of clear glass or it may be tinted to impart the desired lighting effect upon the cell or drawing being photographed. The lower surface of the light housing is provided with a recess forming a constricted passage for the light emitted by the source 203. In other words, the lower surface of the housing 11 is provided with a rear portion 205 substantially parallel to the top 200 and then with an upwardly directed portion 206 which then merges with a downwardly and outwardly directed portion 207.

The light source 203 is practically surrounded by means of adjustably positionable reflectors such as the reflectors 208 and 209 mounted upon bars 210 provided with pivot pins 211 journalled in the side walls of the housing. Clamping devices, indicated at 212, are used for adjustably positioning the reflectors 209. It has been found desirable to use a plurality of relatively narrow spaced reflectors mounted upon horizontal axes throughout those portions of the housing immediately to the rear and below the light source. Above the light source the reflectors may be of greater width as indicated at 213, for example. The upper and forward portion of the light housing 11 preferably includes a large reflector 215 pivoted as at 216, the rear of such reflector being adjustably positionable by means of an externally threaded bolt 217 supported by a bearing bracket 218 and extending through a nut 219 provided with a lock bolt 220 whose shaft extends through a slot 221 formed in the frame 223 which supports and retains the reflecting member 215. Rotation of the bolt 217 thereby raises or lowers the rear portion of the reflector 215, permitting accurate and minute changes in the direction of reflected light emitted through the window 204. By having the various strip reflectors such as 208, 209, 213, etc., pivotally adjustable, the direction and amount of light reflected or emitted from the housing to any desired portion of the drawing or cell may be accurately controlled.

Furthermore, it has been found by adjusting the reflectors 224, 225, etc. (positioned below the light source 203) so as to present reflecting surfaces facing in the direction of the light source 203, the light emitted by said source may be directed onto the surface of the cell being illuminated, as shown by dotted line 226 in Fig. 29, thereby most effectively utilizing the luminosity of the light source. The arrangement of reflectors shown has been found to produce intense localized illumination far in excess of that ordinarily emitted by the lamps.

In order to most effectively utilize the luminescence of the filament of the light source 203, means are provided for adjustably positioning such filament. The side of each lamp housing may be provided with a circular port in which there is adjustably positioned a circular member 227 provided with a diametrically extending slot 228. Slidably mounted in such slot is a clamp 229 provided with a boss 230 having an internally threaded bore adapted to receive a machine screw 231 passing through a lug 232 extending from the circular member 227. Rotation of the machine screw 231 will adjustably position the clamp 229 along the diametrically disposed slot 228.

The clamp 229 receives the conduit 233 leading to the base 234 of the light source 203, the conduit 233 being suitably clamped or tightened in position by the member 229. Current by conductors 235 is supplied through the conduit 233. It is to be noted that by means of this construction means are provided whereby the entire lamp 203 may be turned and adjustably positioned upon its longitudinal axis and the axis of the conduit 233 in the clamp 229. Furthermore, the clamp and the light source 203 may be moved along the diametrical slot 228 by means of the machine screw 231. Furthermore, the entire circular holder 227 may be rotated within the side of the housing 11 so as to cause the slot 228 to assume different positions with respect to the horizontal. In this manner the filament of the light source 203 may be said to be adjustably positionable within a cylindrical area equivalent to the diameter of the circular plate 227. Very critical adjustments can thus be readily accomplished.

Attention has been called to the fact that in planes A and B the light housings are mounted upon brackets 195. As an alternative construction, more specifically shown in Figs. 20 and 21, these light housings may be mounted upon slotted arms 240 and 241 attached to the side members 183 and 184. As shown in Fig. 21, the lamp housings may be attached to either the upper or the lower slotted arms. In certain instances, the background drawings may be made on opaque or translucent materials and in order to create desired effects, some light may be required upon the rear surfaces of such translucent drawings or paintings in order to create the desired pictorial effect in the finished film. Ordinarily, however, the light is applied only to the upper surfaces of the drawings, i. e., the surfaces facing the camera lens.

Focusing

In certain forms of the apparatus shown the camera 8 is positioned at a height of from 8 to 12 feet above the level of the base 5 and the various planes A to E may be spaced distances ranging from 6 inches to 24 inches apart. The provision of intense illumination within such constricted space becomes a problem. The adjustment of the illumination and of the various cells so as to produce a perfect composite image upon the film in the camera 8 requires careful focusing and arrangement of the cells. Because of the height of the apparatus and the awkward position of the camera, it is desirable to have means whereby the camera may be focused and the operator permitted to visually observe the arrangement of the cells from a point coincidental with the optical axis of the camera.

Referring to Fig. 30, the lens of the camera is indicated at 250 and various drawings or planes are indicated at A, C and E. In accordance with this invention a mirror 251 is mounted upon horizontally disposed pivots attached to the camera bracket 32 and adapted to be swung into the path of light rays entering the camera along its optical axis. Light from the cells A, C and E is then reflected by the mirror 251 and by a prism 252 attached to a suitable stationary standard, towards another prism 253. A single lens 254 is interposed between the prisms 252 and 253, thereby permitting the observer to see the images carried by the different planes or cells A, C and E in a regular position upon the ground glass or observation screen 255. It is to be understood that during actual photography the mirror 251 is swung out of the path of the light entering the camera lens 250.

Sequence control

During the production of an animated photoplay, a multitude of drawings are made. From three to seven or even more of these individual drawings may be photographed simultaneously to produce a single frame of the motion picture or photoplay. Some drawings may only bear a portion of a character, such as an arm, which is then photographed in different positions so as to create the impression of an arm moving either slowly or rapidly, as the situation or story requires. In the production of animated photoplays, the scenario is carefully prepared and very often the entire musical accompaniment is not only written but even recorded before any of the pictures are made. The animators then prepare drawings in accordance with the music so as to have the movements of the various figures correspond with the tempo of the music. The duration of a specified form of action must be correlated to the predetermined schedule or tempo of the music, due regard being had to the fact that twenty-four frames of motion picture film are projected per second during exhibition. The photography of the composite scenes which represent the photoplay is a step by step operation and each frame must depict the action in correct synchronism with the music and tempo as well as sequence. The settings of the camera and of the various contact and background planes may vary. For example, although the same background is employed, the script may call for a sequence of picture frames in the finished film which creates the illusion of what is known as a panning shot, that is, the eye of the camera sweeps across the scene and at the same time may approach the scene so as to end up in a close-up of a character or actor. During such a shot the camera carriage may be moved downwardly while at the same time the camera may move from right to left. Various adjustments in the iris or in focus may have to be made.

In order to insure accuracy and prevent mistakes, it has been found desirable to prepare an exposure sheet, such as is shown in Fig. 31 of the appended drawings. This exposure sheet identifies each frame in a sequence to be taken by the camera and bears a record of the various positions which are to be assumed by each of the planes A to E and by the camera carriage. This exposure sheet machine (Fig. 31) is employed in the following manner and by the following means:

The base 5 of the machine has been identified as being level and fixed. The vertically extending rack gears 54, 55, etc. are marked along their sides with indices representing distances in inches or fractions of an inch above a zero or datum plane in the base 5. Such indices are specifically illustrated in Fig. 17 on the side of the rack gear 55. Suitable pointers are carried by the various planes so that approximate readings may be obtained by observing the location of the pointers with respect to the indices carried by the rack gears. Since approximate settings are not enough and the position of the various cells must be known to a thousandth of an inch, each of the various controls heretofore described includes a micrometer counter similar to that shown in Fig. 10. In this figure it will be recalled that the hand wheel 93 operates the mechanism for moving the background support 85 laterally. The hand wheel 93 is mounted upon the shaft 92. Such shaft is provided with a gear 260 which then drives the shaft 261 of a counter 262 having a window 263, this counter reading in thousandth of an inch and indicating the precise position of or extent of movement of the supporting members 83 and 84, and the plate 85. Mounted immediately above the window 263 is a pilot light 264 within a housing 265, the pilot light illuminating the face of the counter 262.

Similar counters are coupled to the shafts operated by hand wheel 42 (controlling the transverse movement of the carriage 24), to the shaft operated by hand wheel 52 and controlling the lateral movement of the carriage 22, to the shaft operated by hand wheel 63 and controlling the vertical movement of the camera carriage 7, to the shaft controlled by hand wheel 102 and controlling the lateral movement of the peg bar 81, to the shaft operated by hand wheel 103 and controlling the movement of the peg bar 80 and to the shaft operated by hand wheel 110 controlling the vertical movement of the contact plane. Every control shaft on every contact plane or camera plane is provided with a counter which is correlated to the central vertical axis of the entire machine so that the precise position of any drawings in any plane and at any elevation may be immediately ascertained. Furthermore, the distances separating the plane of a drawing on contact plane A from the elevation of a drawing held by a lower plane, such as D, may be immediately determined by observing the counter readings and subtracting the same, one from the other. Similarly, the distance separating the camera lens from a particular drawing carried by any of the planes may be determined from the various counters.

By means of these counters (which have not been shown attached to each and every of the various control shafts in order to obviate confusion) and by means of the exposure sheet shown in Fig. 31, the individual operators may positively position the various planes and the drawings carried thereby with respect to the camera so as to insure the production of perfect photographs differing from each other only to the extent required by the script.

The exposure sheet 270 is carried upon a suitable table or pedestal and movable thereover is an index member 271 attached to chains 272 and 273 passing over suitable sprockets including a sprocket 274 which is driven by means of a Selsyn motor 275 interlocked with another Selsyn motor 318 on the camera carriage, which rotates when the camera is operated. In this manner the index 271 moves over the exposure sheet 270 every time an exposure is made in the camera, thus positively indicating to the control man the particular settings which are to be made for each frame.

Master circuit

Reference has been made heretofore to the provision of a service gutter 17 alongside the machine and to various electrical connections. The interrelation of the various elements in such manner as to permit operation in accordance with the methods of this invention is illustrated on the master circuit and wiring diagram, Fig. 34. By referring to this diagram, it will be seen that the service gutter is indicated at 17. The wiring equipment carried by the camera is enclosed by the dotted line 280. The elements contained at a master control table ordinarily located near the exposure sheet, are indicated within the dotted square 281. The various elements included within a switchboard are indicated within the dotted line 282. A contact plane with but a single control is diagrammatically represented as embracing the elements shown within the square 283.

In actual operation, a cable is plugged into one of the outlets of the service 17 and connected with each of the various contact and background planes, such as the plane 283. The contact plane 283 may include, as heretofore described, a plurality of counters connected to the various elevating control means, transverse and lateral control means, peg bars, etc. Each of these control means not only includes a counter but also a pilot light which illuminates the face of the counter. The master circuit is so designed that when the individual operators handling the separate planes are at liberty to make adjustments, the pilot lights on the planes are energized, thereby permitting the operators to read the counter and to make settings in accordance with the master exposure sheet. When, however, they have completed their setting, they press a button closing a contact as at 290, which causes energization of a locking relay allocated to that particular contact plane. When this locking relay closes by reason of the operation of the switch 290, the pilot light, indicated at 291, is automatically extinguished so that the operator can no longer make adjustments. The pilot light will remain extinguished until the control man at the master control table 281 closes the necessary circuit and causes the camera to take a photographic exposure of the various drawings. After such exposure has been made, the control man may press a plane release switch which again supplies current to the pilot lights on the various contact planes, indicating to the operators thereof that they may now proceed to make further adjustments in accordance with the next frame indicated by the exposure sheet machine. The plane release switch may be operated at any time for the purpose of permitting operators to check their settings or make a correction.

The appended diagram (Fig. 34) is of the single line type. Power is supplied through the line 292 and passes through the rectifier 293. In the illustrative embodiment of the machine, energy at six volts is supplied by the line 294 to a plane release relay 295. Between the plane release relay 295 and a camera relay (so marked) is a series of locking relays marked A, B, C, D, etc. Each of these locking relays is in communication with one of the many planes on the machine, through a cable 296 leading to the service gutter 17. All of these various relays must be locked and closed by operation of buttons, such as 290, before the entire circuit is closed to the camera relay, current to the camera relay passing along the line 297 and then through line 298 to a clutch release relay 299 in the camera carriage. This relay is not energized, however, unless the return line, which is indicated at 300 and leads to a dimmer relay 301, is connected with the ground, 304 and 305. In other words, the dimmer relay 301 must be closed before the clutch relay 299 will be placed in operative condition, subject to control by clutch release switch 303 on the master control table. The function and purpose of the dimmer relay may be explained as follows:

The various light sources 203 used in the machine are of high intensity and if subjected to continuous operation, would have a very short life. In order to conserve such light sources, the control man introduces resistance in series with these lines by operating a dimmer switch, indicated at 302. When the dimmer switch is closed by the control man, the dimmer relay 301 is energized, which closes the circuit to the ground at 306, this in turn energizing a magnetic switch 307 which shorts out the series resistance in the lamp circuit, the resistance being indicated at 308. It is to be noted, however, that unless this dimmer switch 302 is closed, closure of the clutch release switch 303 will not energize the clutch release relay 299. If, however, the dimmer switch 302 has been closed, then operation of the clutch release switch 303 connects the clutch release relay 299 through lines 300, 304 and 305 with the ground. The clutch release relay 299 operates a single revolution clutch on the camera carriage which in turn permits the camera motor to operate the shutter and permit an exposure to be made in the camera 8. The camera motor referred to is indicated at 310 in Fig. 34.

Before the control man operates the dimmer switch and the clutch release switch 303 previously mentioned, a ready light 311 should be energized to indicate that the various operators have completed their settings on the planes. The ready light 311 is connected as by lines 312 and 298 with the camera locking relay at the end of the series of locking relays A, B, C, D, etc. When all of these relays have been locked by the operators on the various planes (such locking being accomplished by the operation of switches such as 290), then the ready light is energized and visually indicates to the control man that settings have been made.

In some instances, not all of the planes that the machine is capable of handling are being used in the photography of a scene so that certain of the locking relays A, B, C, etc., are not connected or associated with a plane in the machine. If, for example, the plane B is not being used, then a corresponding cutout switch 313 is manually closed, this cutout switch then locking relay B. By operating any of the appropriate switches adjacent to 313, any of the locking relays may be by-passed, thereby obviating the necessity of having all of the locking relays locked before the ready light 311 is energized on the control table 281.

It is also to be noted that neither the clutch release relay nor the clutch release switch 303 will be operated unless all of the locking relays are either locked or by-passed as described. It has been previously stated that when an operator on a plane closes his operating switch 290, the pilot light 291 will be extinguished. This is accomplished as follows:

When the operator closes the switch 290 the corresponding locking relay is energized so as to place the clutch release switch 303 in operative condition. The locking relays A, B, C, etc. are, however, of the double contact type so that when the relay is energized by closure of switch 290, the locking relay breaks a previously existing circuit which has been energizing the pilot light 291 and now closes the circuit leading to the line 298. The current supply to the pilot lights and to the pilot light side of the locking relays is indicated at 315.

The various locking relays A, B, C, etc. in their normal spring-locked position close the circuit whereby current is supplied as by line 315 to the various pilot lights 291 on the planes. When these planes have been set and the operators have indicated the completion of their setting by operating the switch 290, the locking relays then are energized so as to supply current as by line 298 to the clutch release switch 303. After the control man has caused an exposure to be taken by the camera (in the manner previously described) or at any other suitable time, such control man can place the locking relays A, B, C, etc., in their normal position (whereby current is supplied to the various pilot lights on the planes) by operating a plane release switch 316 which closes the circuit as by line 317 to a plane release relay 295. This plane release relay will now break the supply of power to lines 297 and line 315, causing all of the locking relays A, B, C, etc. to assume their normal spring-actuated position. As soon as the plane release switch is released, however, the relay 295 again closes the circuit between 294 and the lines 297 and 315.

The Selsyn motor 318, indicated on the camera carriage 280 of Fig. 34, is only driven when the clutch release relay 299 has operated and an exposure is being made. The Selsyn motor 318 is interlocked with the motor 275 shown within the master control table 281 on Fig. 34 and also shown in Fig. 31. The function of the Selsyn motor 275 has been previously described.

Current to the two Selsyn motors 275 and 318 is normally supplied from the power line 292 through switch 319. In order to make certain that current is supplied to these motors during operation, pilot lights, such as 320 on the control table and 321 on the camera carriage, are provided.

In order to facilitate the making of numerous adjustments on the camera carriage, an independent set of light sources is ordinarily used, these light sources being indicated at 322. These work lights 322 are automatically extinguished when the operator on the camera carriage closes the contact 323 at the conclusion of his adjustments. Closure of the contact 323 energizes the locking camera relay (at the end of the series A, B, C, etc.). When the camera relay just mentioned is locked by operation of the switch 323, the pilot light 324 is extinguished and the relay 325 is deenergized, the latter causing the current supply to the work lights to be interrupted.

In some instances, particularly when making a simple scene involving the use of only one or two planes, it is desirable to permit an operator on the plane to operate the camera without the necessity of an operator on the plane and a control man at the table 281. In order to permit a single operator on a plane to operate the camera, all but the desired plane are by-passed as, for example, by the closure of switches in the series 313. The locking circuits on the locking relays A, B, C, etc. are normally grounded through the line 330 and switch 331, as shown in full lines. By breaking the ground (as by moving the switch 331 into dotted position), the relays will no longer operate automatically and only close the camera release circuit when the operating switch 290 on the plane is actually closed. When the switch 331 is placed in dotted position, the clutch release switch is also by-passed. During single plane operation the lights on the plane are ordinarily left on all the time so that the dimmer switch 302, previously described, is not operated.

From the description given hereinabove, it will be noted that the present invention provides a combination of elements together with means for insuring proper cooperation therebetween to the end that the production of animated photoplays may be greatly facilitated and errors minimized or eliminated. It will be noticed that each movable element is provided with means whereby the precise position and location may be readily determined. Means have also been provided whereby the accidental operation of the camera can not take place since the various pilot lights permit the operators to maintain contact with each other even though the operators are positioned at different planes and can not personally inspect each other's work. The series of locking relays described hereinabove together with the provision of the clutch release relay in the ground circuit prevents accidental exposure in the camera until all settings have been completed and have been so reported by the individual operators.

The machine of this invention permits many novel and realistic effects to be obtained. The finished photoplays have an effect of depth which can not be obtained by photographing a number of closely adjoining transparent cells in the well known manner generally used in the production of animated cartoons in the past. This effect of depth is enhanced by placing primary action drawings within the principal focal plane of the camera lens whereas the background drawings or paintings are placed at a sufficient distance away from the lens to produce a slight amount of diffusion, this placement creating an effect of distance and depth which is practically impossible to portray by painting. It has been found, for example, that when the circle of confusion amounts to about 0.005 inch, the resulting photographic image will be readily discernible but will have a softness which immediately connotes distance to the observer. Similarly, elements which are in the immediate foreground may be placed so close to the lens of the camera as to be slightly out of focus, the observer of the finished photoplay then being cognizant of the objects in the immediate foreground but the diffused effect of such objects will not detract from the primary action which is depicted in the middle distance.

The apparatus described herein also permits the artist to depict the various elements in tones and shades which are most pleasing to him, with the knowledge that operation of the machine herein disclosed will not change or modify the pictorial effect. The separately adjustable lighting permits each and every plane to be illuminated under controlled conditions capable of resulting in a photographic image in the camera which truly represents the artist's interpretation and which does not emphasize or subdue certain of the components due to light absorption of superimposed cells, glass plates, etc. Identical photographic effects can thus be obtained even though the light reflected from one plane needs pass through a plurality of sheets of glass and Celluloid whereas the light reflected from an image on the top plane is not absorbed or affected by any superimposed glass plates.

The effect of depth or third dimension is also enhanced by reason of the fact that the various pictorial elements depicted on immediate foreground, middle distance and background planes may be caused to move with relation to each other whenever a "panning" or traveling shot is being depicted. For example, if one considers a scene in which characters are running along a road from a point of view to one side of the road, a row of trees being positioned between the point of view and the road, and hills and mountains in the background beyond the road, the camera being moved in a line parallel to the road but having its optical axis directed toward the road at all times, when the movement of the pictorial elements depicting the immediate foreground and trees coupled with the movement of the middle distance with respect to the background depicting the mountains and sky will create an effect of depth which is impossible to portray in the previously known methods of animation.

In the production of trucking shots in which the camera is moved either toward or away from the principal plane of action, the background planes may be also moved toward or away from the principal plane of action so as to maintain true pictorial perspective. If, for example, the background carries a moon whereas the action represents a person sitting on a bench beneath a tree and the camera is moved toward the principal plane of action so as to produce a close-up of such person, the background plane carrying the moon may be moved away from the action so as to prevent the moon from growing unnecessarily large in the finished picture and thereby creating an unnatural effect.

The various sources of illumination which are employed may be provided with color filters for the purpose of changing the general tone of the characters or action depicted. The use of light filters on the sources of illumination is of particular advantage in producing animated photoplays in color.

Although the various elements and machines described hereinabove have been particularly designed for use in the production of animated photoplays, it is to be noted that the apparatus may also be used in other forms of photography such as, for example, the photography of miniatures. The arrangement shown and described for adjustably and regulatably positioning the camera may be used in various forms of photographic equipment. All changes, modifications, uses and adaptations of the invention embraced by the appended claims are to be considered a part of the present invention.

I claim:

1. In an apparatus of the characer described, the combination of: vertically extending guide posts, a camera frame slidably mounted on the upper portion of said posts; a camera carried by said frame, means for moving said camera laterally and transversely on said frame, means for raising and lowering said frame; a plurality of vertically movable spaced frames slidably mounted on said posts below said camera frame, means carried by each of said frames for supporting pictorial representations, means carried by at least one of said frames for adjustably positioning pictorial representations carried thereby laterally and transversely, and means for adjustably moving each of said frames along said guide posts.

2. In an apparatus of the character described, the combination of: vertically extending guide posts, a camera frame slidably mounted on the upper portion of said posts; a camera carried by said frame, means for moving said camera laterally and transversely on said frame, means for raising and lowering said frame; a plurality of vertically movable spaced frames slidably mounted on said posts below said camera frame, means carried by each of said frames for supporting pictorial representations, means carried by at least one of said frames for adjustably positioning pictorial representations carried thereby laterally and transversely, means for adjustably moving each of said frames along said guide posts; opposing light housings carried by at least one of said frames, each light housing having a long top, a shorter bottom portion and an upwardly and forwardly inclined window, reflecting means positioned in the top of said housing, said reflecting means being pivoted at its forward portion to said housing and provided with adjustable elevating means at the rear thereof, a light source holder in the side of the housing, a light source adjustably held by said holder, means for adjustably positioning said holder, and a plurality of horizontally extending relatively narrow reflecting means positioned in curved sequence around said light source, said narrow reflecting means being pivotally and adjustably held by sides of said housing.

3. In an apparatus of the character described, the combination of: vertically extending guide posts, a camera frame slidably mounted on the upper portion of said posts; a camera carried by said frame, means for moving said camera laterally and transversely on said frame, means for raising and lowering said frame; a plurality of vertically movable spaced frames slidably mounted on said posts below said camera frame, transparent means carried by said frames for supporting pictorial representations, means carried by at least one of said frames for adjustably positioning pictorial representations carried thereby laterally and transversely, means for adjustably moving each of said frames along said guide posts; counter means associated with each means for raising and lowering said frames along said guide posts and with the means for adjustably positioning pictorial representations, for precisely indicating the elevation and precise position of said frames and pictorial representations.

4. In an apparatus of the character described, the combination of: vertically extending guide posts, a camera frame slidably mounted on the upper portion of said posts; a camera carried by said frame, means for moving said camera laterally and transversely on said frame, means for raising and lowering said frame; a plurality of vertically movable spaced frames slidably mounted on said posts below said camera frame, means carried by each of said frames for supporting pictorial representations, means carried by at least one of said frames for adjustably positioning pictorial representations carried thereby laterally and transversely, means for adjustably moving each of said frames along said guide posts; opposing light housings carried by at least one of said frames and adapted to illuminate pictorial representations carried thereby without illuminating the bottom of a higher pictorial representation, each of said light housings including a number of angularly adjustable reflecting means, and suction conduits operably associated with said light housings.

5. In an apparatus of the character described, the combination of: vertically extending guide posts, a camera frame slidably mounted on the upper portion of said posts; a camera carried by said frame, means for moving said camera laterally and transversely on said frame, means for raising and lowering said frame; a plurality of vertically movable spaced frames slidably mounted on said posts below said camera frame, means carried by each of said frames for supporting pictorial representations, means carried by at least one of said frames for adjustably positioning pictorial representations carried thereby laterally and transversely, means for adjustably moving each of said frames along said guide posts; opposing light housings carried by at least one of said frames and adapted to illuminate pictorial representations carried thereby without illuminating the bottom of a higher pictorial representation, each of said light housings including a number of angularly adjustable reflecting means, suction conduits operably associated with said light housings; and counter means associated with each means for raising and lowering said frames along said guide posts and with the means for adjustably positioning pictorial representations, for precisely indicating the elevation and position of said frames and pictorial representations.

6. In a machine for making animated photoplays and the like, the combination of: a holder for a camera, motor means carried by said holder, a variable speed transmission connected to said motor, a camera drive shaft, and an operable connection between said variable speed transmission and said camera drive shaft, said connection including a single revolution clutch and a Selsyn motor connected to said camera drive shaft; a master sequence control sheet, an index member movably positioned over said sheet, and a Selsyn motor drive for said index member, said last-named Selsyn motor being operably connected to and controlled by the Selsyn motor on the camera holder.

7. In a machine for making animated photoplays, the combination of: vertical guide posts provided with vertically extending rack gears, a plane for supporting pictorial representations, said plane being carried by said guide posts and rack gears and comprising a frame, gear means carried by the frame and engaging said rack gears, means for regulatably driving said gear means to raise and lower the frame on said guide posts, a transparent support for pictorial representations mounted on said frame, means for moving said transparent support laterally, and counter means associated with the last-named means for accurately positioning said transparent support.

8. In a machine for making animated photoplays, the combination of: vertical guide posts provided with vertically extending rack gears, a plane for supporting pictorial representations, said plane being carried by said guide posts and rack gears and comprising a frame, gear means carried by the frame and engaging said rack gears, means for regulatably driving said gear means to raise and lower the frame on said guide posts, a counter geared to said driving means for indicating the precise position of said frame, a transparent support for pictorial representations mounted on said frame, means for moving said transparent support laterally, and counter means associated with the last-named means for accurately positioning said transparent support.

9. In a machine for making animated photoplays, the combination of: vertical guide posts provided with vertically extending rack gears, a plane for supporting pictorial representations, said plane being carried by said guide posts and rack gears and comprising a frame, gear means carried by the frame and engaging said rack gears, means for regulatably driving said gear means to raise and lower the frame on said guide posts, a transparent support for pictorial representations mounted on said frame, means for moving said transparent support laterally, counter means associated with the last-named means for accurately positioning said transparent support, a peg bar adjacent said support, means for adjustably positioning said peg bar, and counter means associated with the positioning means for accurately determining the position of said peg bar.

10. In a machine for making animated photoplays, the combination of: vertical guide posts provided with vertically extending rack gears, a plane for supporting pictorial representations, said plane being carried by said guide posts and rack gears and comprising a frame, gear means carried by the frame and engaging said rack gears, means for regulatably driving said gears means to raise and lower the frame on said guide posts, a counter geared to said driving means for indicating the precise position of said frame, a transparent support for pictorial representations mounted on said frame, means for moving said transparent support laterally, counter means associated with the last-named means for accurately positioning said transparent support, a peg bar adjacent said support, means for adjustably positioning said peg bar, and counter means associated with the positioning means for accurately determining the position of said peg bar.

11. In a machine for making animated photoplays, the combination of: vertical guide posts provided with vertically extending rack gears, a plane for supporting pictorial representations, said plane being carried by said guide posts and rack gears and comprising a frame, gear means carried by the frame and engaging said rack gears, means for regulatably driving said gear means to raise and lower the frame on said guide posts, a transparent support for pictorial representations mounted on said frame, means for moving said transparent support laterally, counter means associated with the last-named means for accurately positioning said transparent support, and a platen carried by said frame and means for raising and lowering the platen.

12. In an apparatus of the character described, the combination of: an adjustably positionable camera carriage, a camera mounted thereon, a motor, a driving connection between said motor and camera, a clutch interposed in said driving connection; a plurality of movably adjustable planes on which pictorial representations may be adjustably positioned, a pilot light, and a switch on each of said planes and on said camera carriage: and an electrical circuit of the single line type, said circuit including a locking relay of the double contact type corresponding to each plane and to the camera carriage, said locking relays being in series; an energy supply line connected to the normal side of all relays and to the energized side of the first relay of the series, a clutch release switch in the ground circuit leading from the energized side of the last relay of the series; a clutch release relay interposed in said ground circuit and adapted to actuate said clutch; circuit means between each switch on planes and camera carriage and a corresponding locking relay whereby said corresponding relays may be energized by said plane and camera carriage switches, and electrical connections between each pilot light and the normal side of said locking relays.

13. In an apparatus of the character described, the combination of: an adjustably positionable camera carriage, a camera mounted thereon, a motor, a driving connection between said motor and camera, a clutch interposed in said driving connection; a plurality of movably adjustable planes on which pictorial representations may be adjustably positioned, a pilot light, and a switch on each of said planes and on said camera carriage: an electrical circuit of the single line type, said circuit including a locking relay of the double contact type corresponding to each plane and to the camera carriage, said locking relays being in series; an energy supply line connected to the normal side of all relays and to the energized side of the first relay of the series, a clutch release switch in the ground circuit leading from the energized side of the last relay of the series; a clutch release relay interposed in said ground circuit and adapted to actuate said clutch; circuit means between each switch on planes and camera carriage and a corresponding locking relay whereby said corresponding relays may be energized by said plane and camera carriage switches, electrical connections between each pilot light and the normal side of said locking relays, light sources on said planes, a separate current supply to said light sources, means for introducing resistance into said separate current supply, and a switch interposed in the ground circuit for by-passing said resistance.

14. In an apparatus of the character described, the combination of: a vertically adjustable camera carriage including a camera, a motor, a driving connection between said motor and camera, and a clutch interposed in said driving connection; a vertically adjustable frame on which pictorial representations may be carried positioned beneath said camera carriage, a pilot light, and a switch on said plane and on said camera carriage; an electrical circuit of the single line type including a locking relay of the double contact type connected to the switch on said plane, another locking relay of the double contact type connected to the switch on said camera carriage, the two locking relays being in series, an energy supply line connected to the normal side of both relays and to the energized side of the relay connected to said plane, a clutch release switch in the ground circuit leading from the energized side of the relay connected to said camera carriage switch, and a clutch release relay interposed in said ground circuit and adapted to actuate said clutch.

15. In an apparatus of the character described for making animated photoplays, the combination of: vertical guide posts provided with vertically extending rack gears; a camera frame carried by said guide posts and rack gears; a holder for a camera carried by said frame, means for moving said holder laterally and transversely in said frame, means for raising and lowering said camera frame; a plurality of spaced frames vertically movable on said posts below said camera frame, means carried by each of said frames for supporting pictorial representations, means carried by at least one of said frames for adjustably positioning pictorial representations carried thereby laterally and transversely, and means including elements co-acting with the rack gears for adjustably moving each of said frames along said vertically extending rack gears.

16. In an apparatus of the character described for making animated photoplays, the combination of: vertical guide posts provided with vertically extending rack gears; a camera frame carried by said guide posts and rack gears; a holder for a camera carried by said frame, means for moving said holder laterally and transversely in said frame, means for raising and lowering said camera frame; motor means carried by said holder, a variable speed transmission connected to said motor, a camera drive shaft, an operable connection between said variable speed transmission and said camera drive shaft, said connection including a single revolution clutch and a Selsyn motor connected to said camera drive shaft; a master sequence control sheet, an index member movably positioned over said sheet, and a Selsyn motor drive for said index member, said last-named Selsyn motor being operably connected to and controlled by the Selsyn motor on the camera holder; a plurality of spaced frames vertically movable on said posts below said camera frame, means carried by each of said frames for supporting pictorial representations, means carried by at least one of said frames for adjustably positioning pictorial representations carried thereby laterally and transversely, and means including elements co-acting with the rack gears for adjustably moving each of said frames along said vertically extending rack gears.

17. In an apparatus for making animated photoplays, the combination of: vertical guide posts provided with vertically extending rack gears, a camera frame carried by said guide posts and rack gears; a holder for a camera carried by the frame, means for moving said holder laterally and transversely in said frame, means for raising and lowering said camera frame, a plurality of spaced planes carried by said guide posts and rack gears, each of said planes including a frame, gear means carried by the frame and engaging said rack gears, means for regulatably driving said gear means to raise and lower the frame on said guide posts, a transparent support for pictorial representations mounted on said frame, and means for moving said transparent support laterally.

18. In an apparatus for making animated photoplays, the combination of: vertical guide posts provided with vertically extending rack gears, a camera frame carried by said guide posts and rack gears; a holder for a camera carried by the frame, means for moving said holder laterally and transversely in said frame, means for raising and lowering said camera frame, motor means carried by said holder, a variable speed transmission connected to said motor, a camera drive shaft, an operable connection between said variable speed transmission and said camera drive shaft, said connection including a single revolution clutch and a Selsyn motor connected to said camera drive shaft; a master sequence control sheet, an index member movably positioned over said sheet, and a Selsyn motor drive for said index member, said last-named Selsyn motor being operably connected to and controlled by the Selsyn motor on the camera holder; a plurality of spaced planes carried by said guide posts and rack gears, each of said planes including a frame, gear means carried by the frame and engaging said rack gears, means for regulatably driving said gear means to raise and lower the frame on said guide posts, a transparent support for pictorial representations mounted on said frame, and means for moving said transparent support laterally.

19. In an apparatus for making animated photoplays, the combination of: vertical guide posts provided with vertically extending rack gears, a camera frame carried by said guide posts and rack gears; a holder for a camera carried by the frame, means for moving said holder laterally and transversely in said frame, means for raising and lowering said camera frame, a plurality of spaced planes carried by said guide posts and rack gears, each of said planes including a frame, gear means carried by the frame and engaging said rack gears, means for regulatably driving said gear means to raise and lower the frame on said guide posts, a transparent support for pictorial representations mounted on said frame, and means for moving said transparent support laterally; opposing light housings carried by at least one of said frames, each light housing having a long top, a shorter bottom portion and an upwardly and forwardly inclined window, reflecting means positioned in the top of said housing, said reflecting means being pivoted at its forward portion to said housing and provided with adjustable elevating means at the rear thereof, a light source holder in the side of the housing, a light source adjustably held by said holder, means for adjustably positioning said holder, and a plurality of horizontally extending relatively narrow reflecting means positioned in curved sequence around said light source, said narrow reflecting means being pivotally and adjustably held by sides of said housing.

20. In an apparatus for making animated photoplays, the combination of: vertical guide posts provided with vertically extending rack gears; a plurality of spaced planes carried by said guide posts and rack gears, each of said planes including a frame, gear means carried by the frame and engaging said rack gears, means for regulatably driving said gear means to raise and lower the frame on said guide posts, a transparent support for pictorial representations mounted on said frame, means for moving said transparent support laterally; opposing light housings carried by at least one of said frames, each light housing having a long top, a shorter bottom portion and an upwardly and forwardly inclined window, reflecting means positioned in the top of said housing, said reflecting means being pivoted at its forward portion to said housing and provided with adjustable elevating means at the rear thereof, a light source holder in the side of the housing, a light source adjustably held by said holder, means for adjustably positioning said holder, and a plurality of horizontally extending relatively narrow reflecting means positioned in curved sequence around said light source, said narrow reflecting means being pivotally and adjustably held by sides of said housing.

21. In an apparatus for making animated photoplays, the combination of: vertical guide posts provided with vertically extending rack gears; a plurality of spaced planes carried by said guide posts and rack gears, each of said planes including a frame, gear means carried by the frame and engaging said rack gears, means for regulatably driving said gear means to raise and lower the frame on said guide posts, a transparent support for pictorial representations mounted on said frame, means for moving said transparent support laterally, means for releasably holding said planes in engagement with said rack gears whereby said planes may be selectively removed from between said vertical guide posts and rack gears by releasing said holding means.

22. In an apparatus for making animated photoplays, the combination of: vertically extending guide posts, a camera carriage movable vertically on said posts, means for raising and lowering said carriage, said camera carriage comprising a frame, means for adjustably positioning said frame vertically, a laterally movable carriage on said frame, a transversely movable table mounted on said carriage, means for adjustably positioning said carriage and table, a circular plate on said table, means for adjustably rotating said plate about a vertical axis, a holder on said plate adapted to support a camera and camera driving means, and a camera mounted on said holder with the optical axis substantially coincidental with the axis of rotation of said circular plate; a plurality of vertically movable spaced frames slidably mounted on said posts below said camera carriage, means carried by each of said frames for supporting pictorial representations, means carried by at least one of said frames for adjustably positioning pictorial representations carried thereby laterally and transversely, and means for adjustably moving each of said frames along said guide posts.

23. In an apparatus for making animated photoplays, the combination of: vertically extending guide posts, a camera carriage movable vertically on said posts, means for raising and lowering said carriage, said camera carriage comprising a frame, means for adjustably positioning said frame vertically, a laterally movable carriage on said frame, a transversely movable table mounted on said carriage, means for adjustably positioning said carriage and table, counter means geared to said positioning means for indicating precise transverse and lateral position of said carriage and table, a circular plate on said table, means for adjustably rotating said plate about a vertical axis, a holder on said plate adapted to support a camera and camera driving means, and a camera mounted on said holder with the optical axis substantially coincidental with the axis of rotation of said circular plate; a plurality of vertically movable spaced frames slidably mounted on said posts below said camera carriage, means carried by each of said frames for supporting pictorial representations, means carried by at least one of said frames for adjustably positioning pictorial representations carried thereby laterally and transversely, and means for adjustably moving each of said frames along said guide posts.

24. In an apparatus for making animated photoplays, the combination of: vertically extending guide posts, a camera carriage movable vertically on said posts, means for raising and lowering said carriage, said camera carriage comprising a frame, means for adjustably positioning said frame vertically, a laterally movable carriage on said frame, a transversely movable table mounted on said carriage, means for adjustably positioning said carriage and table, a circular plate on said table, means for adjustably rotating said plate about a vertical axis, a holder on said plate adapted to support a camera and camera driving means, and a camera mounted on said holder with the optical axis substantially coincidental with the axis of rotation of said circular plate; a motor carried by said camera holder, said motor constituting camera driving means, a variable speed transmission connected to said motor, a camera drive shaft, an operable connection between said variable speed transmission and said camera drive shaft, said connection including a single revolution clutch and a Selsyn motor connected to said camera drive shaft; a plurality of vertically movable spaced frames slidably mounted on said posts below said camera carriage, means carried by each of said frames for supporting pictorial representations, means carried by at least one of said frames for adjustably positioning pictorial representations carried thereby laterally and transversely, and means for adjustably moving each of said frames along said guide posts; a master sequence control sheet, an index member movably positioned over said sheet, and a Selsyn motor drive for said index member, said last-named Selsyn motor being operably connected to and controlled by the Selsyn motor on the camera holder.

25. In a machine for making animated photoplays, the combination of: a camera carriage including a frame, a holder for a camera carried by the frame, means for moving said holder laterally and transversely in said frame; motor means carried by said holder, a variable speed transmission connected to said motor, a camera drive shaft, an operable connection between said variable speed transmission and said camera drive shaft, said connection including a single revolution clutch and a Selsyn motor connected to said camera drive shaft; a master sequence control sheet, an index member movably positioned over said sheet, and a Selsyn motor drive for said index member, said last-named Selsyn motor being operably connected to and controlled by the Selsyn motor on the camera holder.

26. In a machine for making animated photoplays, the combination of: a camera carriage including a frame, a holder for a camera carried by the frame, means for moving said holder laterally and transversely in said frame, means for rotatably and adjustably positioning said holder; motor means carried by said holder, a variable speed transmission connected to said motor, a camera drive shaft, an operable connection between said variable speed transmission and said camera drive shaft, said connection including a single revolution clutch and a breakaway safety clutch and a Selsyn motor connected to said camera drive shaft; a master sequence control sheet, an index member movably positioned over said sheet, and a Selsyn motor drive for said index member, said last-named Selsyn motor being operably connected to and controlled by the Selsyn motor on the camera holder.

WILLIAM E. GARITY.